(No Model.)

F. J. PECK & J. A. OUTTERSON.
APPARATUS FOR MAKING SOLUTIONS OF BISULPHITES.

No. 464,104. Patented Dec. 1, 1891.

WITNESSES:
Donn Twitchell
C. Sedgwick

INVENTORS:
F. J. Peck
J. A. Outterson
By Munn & Co.
ATTORNEYS

United States Patent Office.

FRANK JAMES PECK AND JAMES ANDREW OUTTERSON, OF DEXTER, NEW YORK.

APPARATUS FOR MAKING SOLUTIONS OF BISULPHITES.

SPECIFICATION forming part of Letters Patent No. 464,104, dated December 1, 1891.

Application filed March 2, 1891. Serial No. 383,373. (No model.)

*To all whom it may concern:*

Be it known that we, FRANK JAMES PECK and JAMES ANDREW OUTTERSON, of Dexter, in the county of Jefferson and State of New York, have invented a new and useful Improvement in Apparatus for Making Solutions of Bisulphites, of which the following is a full, clear, and exact description.

This invention more particularly relates to apparatus for the treatment of solutions of lime and magnesia or of lime or magnesia for making bisulphites thereof, and while it acts upon the same general principle which has been employed for treating various solutions by charging them as they fall in a trickling or divided manner with a gas passing up therethrough, it essentially differs from apparatus heretofore employed in its specific construction and many of its details, separately or in combination, to better adapt it to the purpose for which it is more especially intended, substantially as hereinafter described, and more particularly pointed out in the claims.

Reference is to be had to the accompanying drawings, forming a part of this specification, in which similar letters of reference indicate corresponding parts in all the figures.

Figure 2:
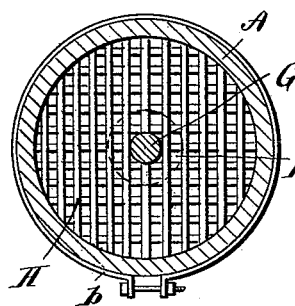
Figure 1:
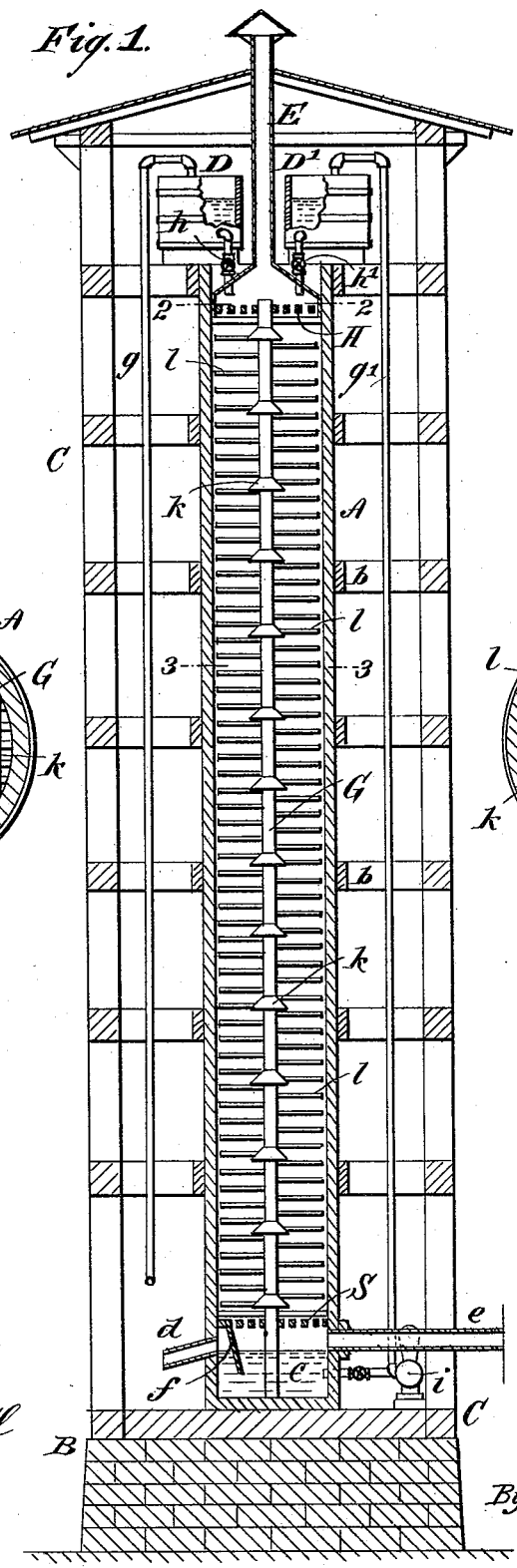
Figure 3:
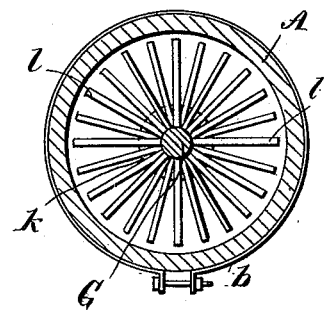

Figure 1 represents a sectional elevation of a tower with inclosing frame-work and other appurtenances making up the apparatus and embodying our invention. Fig. 2 is a horizontal section, in part upon a larger scale, on the line 2 2 in Fig. 1; and Fig. 3 is a further horizontal section upon the line 3 3 in Fig. 1.

A indicates a tower of any suitable height and size, built up in sections or otherwise to suit the location where it is used or strength of the solution required to be treated. Said tower is here shown of circular form; but it might be made square or of different shapes in transverse section and be constructed of wood, brick, tile, or other acid-resisting materials. Thus it may be made of heavy or thick planking bound by bands or hoops $b$ in a secure manner. This tower or tall vat rests upon a suitable foundation B, which may be of brick and which serves to support a frame-work C, that incloses and holds or sustains the tower. The bottom of the tower forms a reservoir for collection of the solution of bisulphite $c$, and is provided with an overflow-pipe $d$ for running the solution off to any suitable storage-tanks, and which is further provided in the upper part below a grating S with a pipe $e$, through which the sulphur gases supplied by any suitable sulphur-burning furnace (not shown in the drawings) pass on entering the tower. A guard or shield $f$, arranged to dip down into the bisulphite solution $c$, serves to prevent said gas from directly passing off with said solution through the overflow-pipe $d$ and insures its upward flow through the tower to charge the lime or magnesia solutions as they fall in a spray or divided form down through the tower.

D is vat or tank on the top floor of the frame-work C or above the tower, into which the solution of lime and magnesia or lime or magnesia is pumped and delivered by a pipe $g$ from any suitable supply vessel or tank. (Not shown in the drawings.) This vat D is provided with a discharge-pipe and valve $h$ for regulating the supply of the solution from said vat to the upper portion of the tower. A similar vat or tank D', provided with a discharge-pipe and valve $h'$, is also arranged above the tower, which tank when needed, as will be hereinafter described, is supplied with the bisulphite solution $c$ from the reservoir at the base of the tower by a pipe $g'$ and pump $i$.

E is a pipe leading from the top of the tower, arranged to pass off any waste or escaping gases, and into or through the base of which the discharge pipes and valves $h$ $h'$ are shown to enter.

G is a shaft or post standing in the center of the tower and extending from the top to the bottom thereof. This shaft may be made of wood or any other acid-resisting material. Upon this shaft, at suitable distances apart throughout its length, are secured cone-shaped lags $k$, of wood or any other suitable material, to aid in giving the requisite trickling to the solution being treated as it falls in its downward course through the tower. Driven into or made fast to the shaft G, and preferably to the lags $k$, throughout the length of the shaft or greater portion thereof surrounding the shaft, are a series, in close succession, of radial blades, pins, fingers, or teeth $l$, of wood or other suitable material, over and between which the solution being treated falls as it trickles down within the tower.

H is a grating, here shown as a double one with the bars crossing one another, arranged in the upper portion of the tower, also made of wood or other suitable material, and serving to hold the upper end of the post or shaft G, also serving to assist in dividing or spraying the solution being treated as it passes into the tower for downward travel therethrough.

In the operation of the apparatus the solution of lime and magnesia or of lime or magnesia to be treated, and which may be made in vats at the base of the tower, (not shown in the drawings,) after being agitated and made of the required strength is pumped through the pipe $g$ into the tank D and allowed to flow in suitable quantities through the pipe and valve $h$ into the top of the tower A over and through the grating H, which serves to break up the entering solution and to prepare it for further division into a mist or spray, as it trickles down through the tower, by the action of the lags $k$ and pins or blades $l$ on the shaft G, and ultimately through the grating S at the bottom of the tower. These devices operate much more effectually than do mere perforated diaphragms or reversely-inclined step-like partitions to break up the solution being treated and to expose its atoms to action by the gases with which it is treated. Thus as said finely-divided solution falls in its downward course over the lags $k$ and over and between the pins or blades $l$ it meets the strong sulphur gases entering by the pipe $e$ and passing up through the tower. In this way the gases are made to come into such direct contact with the atoms of the solution or to produce such a thorough intermingling of the gases and solution as to effectually charge the solution with the gases, the latter becoming condensed or absorbed and their strength added to that of the solution being treated and resulting in a solution of bisulphites at the base of the tower.

In case the bisulphite solution $c$, collected at the base of the tower, is not of the desired strength, it may be pumped by the pump $i$ through the pipe $g'$ into the other tank D', and from thence be passed in suitable quantities down through the tower and over the lags $k$ and over and between the pins or blades $l$ to be recharged with the ascending gases until a proper strength for the bisulphite solution be obtained. This forms a repeating-tower system that will be found of great advantage in many cases.

Having thus described our invention, what we claim as new, and desire to secure by Letters Patent, is—

1. An apparatus for making solutions of bisulphites, comprising a vertical tubular tower having a gas-outlet at its closed upper end, an inlet $e$ above the bottom of the tower to admit the sulphur gas, an outlet for the solution, means for preventing the gas from passing out through said outlet, a vertical shaft G in the tower and provided with radial bars or fingers $l$ throughout its length and extending close to the inner wall of the tower, and a tank at the upper end of the tower, having a pipe entering the top of the tower to supply the liquid to be treated by the ascending sulphur fumes, substantially as set forth.

2. An apparatus for making solutions of bisulphites, comprising a vertical tubular tower having an inlet-pipe $e$ near the bottom to admit the sulphur fumes, an outlet-pipe $d$, a shield $f$ to prevent said fumes from passing out through said pipe, an outlet flue or pipe E at the top of the tower, a tank having a pipe discharging the liquid to be treated into the top of the tower, and means within the tower for breaking the liquid into fine spray or particles in its descent, substantially as set forth.

3. The combination, with the tower A of the apparatus, of the upper grating H and the shaft or post G, with its attached conical lags $k$ and pins or blades $l$, substantially as shown and described.

4. An apparatus for making solutions of bisulphites, consisting in the vertical tubular tower A, having an inlet $e$ for the sulphur fumes and an outlet for the treated liquor above its closed lower ends, two tanks at the top of the tower, both discharging into its upper end, breaking arms or fingers within the tower, a pipe leading from the lower end of the tower below said inlet and outlet up into one of the tanks, and a pump connected with said pipe for forcing the treated liquid up into said tank for a second treatment in the same tower, substantially as set forth.

FRANK JAS. PECK.
JAMES ANDREW OUTTERSON.

Witnesses:
F. B. PITCHER,
JNO. C. McCARTNEY.